United States Patent [19]

Keith

[11] Patent Number: 4,587,147
[45] Date of Patent: May 6, 1986

[54] RETICULATED PRODUCTS AND THEIR MANUFACTURE

[75] Inventor: Donald G. Keith, Mount Eliza, Australia

[73] Assignee: A.A.R.C. (Management) Pty. Limited, Richmond, Australia

[21] Appl. No.: 740,261

[22] PCT Filed: Aug. 28, 1984

[86] PCT No.: PCT/AU84/00162
§ 371 Date: Apr. 1, 1985
§ 102(e) Date: Apr. 1, 1985

[87] PCT Pub. No.: WO85/01014
PCT Pub. Date: Mar. 14, 1985

[30] Foreign Application Priority Data

Aug. 29, 1983 [AU] Australia .................. PG1090/83

[51] Int. Cl.[4] ............... B32B 3/12; B32B 3/28; B32B 7/08
[52] U.S. Cl. .................... 428/59; 156/93; 156/157; 156/159; 156/197; 156/227; 156/258; 428/156; 428/172; 428/174; 428/179
[58] Field of Search ............ 428/54, 59, 156, 172, 428/174, 179; 156/93, 157, 159, 197, 210, 227, 250, 258

[56] References Cited

U.S. PATENT DOCUMENTS

| | | | |
|---|---|---|---|
| 3,227,598 | 1/1966 | Robb | 428/178 |
| 3,574,109 | 4/1971 | Yoshikawa | 428/179 |
| 3,955,019 | 5/1976 | Keith | 428/179 |
| 4,025,996 | 5/1977 | Saveker | 428/174 |

*Primary Examiner*—William J. Van Balen
*Attorney, Agent, or Firm*—Ladas & Parry

[57] ABSTRACT

A substantially planar reticulated material is formed by the conjunction of a plurality of strips of non-planar material so that the strips lie substantially perpendicular to the plane of the reticulated material with their edges lying coplanar with the reticulated material and forming opposite surfaces thereof. Each strip of nonplanar sheet material is formed on each opposite surface with a pattern of crests and valleys of repetitive wavelength such that each pattern repeat contains at least two crests and at least two valleys; in each pattern repeat the height of at least one crest or valley on at least one surface of the strip is different from that of at least one of the other respective crests and valleys on said surface; the recurring height difference produces a corrugation along the strip having a wavelength greater than the wavelength of the crests and valleys; and adjacent strips are abutted with the corrugation opposed to interfit at least one crest in a valley of each opposed corrugation.

16 Claims, 20 Drawing Figures

RETICULATED PRODUCTS AND THEIR MANUFACTURE

This invention relates to reticulated materials of substantially planar configuration which have been formed by the conjunction of a plurality of strips of nonplanar sheet material.

Such products are known in which the strips of nonplanar sheet material lie substantially perpendicular to the plane of the reticulated material so that the edges of the strips lie coplanar with the reticulated material and form opposite surfaces of it. In these materials, projections on the nonplanar sheets are opposed and brought into abutment to leave spaces between adjacent sheets and thus form the reticulated structure of the composite material. The abutted projections in these materials are permanently bonded to ensure shear strength between the strips.

One type of method and apparatus which may be used to form nonplanar sheets is that described, for example, in Australian Patent Specification No. 460,849. This specification describes the cuspation of nonplanar sheets through the action on a sheet of thermoplastic material of a patterned array of projections on opposed tools. The non-planar sheets formed in accordance with the disclosure of this specification have projections of substantially equal height extending from each surface of the sheet and are generally adapted to nest within sheets of similar configuration so that substantially the whole of the opposed surfaces of adjacent sheets are in contact. While the specification refers broadly to alternative sheet forms where the nesting of the sheets is limited by the pattern of the projections and the relative alignment of the adjacent sheets, any limitations on the form of such sheets and their relative configurations if nested in stacks of two or more do not appear to have been investigated.

Other forms and combinations of nonplanar sheets have been proposed but none are known which are any more relevant to the present invention than those of Australian Specification No. 460,849.

Cuspation forming technology has been found particularly useful for the production of sheets to be used in accordance with the present invention. This is at least partly because of the wide range of different patterns which may be formed using this technology and also because the technology allows the substantially continuous production of substantial lengths of nonplanar sheet material. Furthermore cuspation is a unique process in that it provides structurally efficient materials distribution while permitting variable vertical stretch. Accordingly it is useful to adopt and extend the terminology of the cuspation process in describing the present invention.

Bilateral cuspation by counter-thrust of opposed tools carrying cold projections draws hot thermoplastic sheet upwardly and downwardly forming cusps and inverted cusps. The cusp walls are formed by free stretch since the plan area of tool projections is usually less than 5% of the sheet plan area.

To define terms it is necessary to describe tooling principles. The position of the projections is based on a lattice or plane tessellation. This lattice can be triangular or preferably square.

For convenient description, the areas of the lattice may be considered as alternately black and white, as in a chessboard. The upper and lower opposed tools are then considered as two superposed lattices, black areas over black areas and white over white. On the lower tool at the centre of every "black" area is mounted a vertical projection. The upper tool has projections on the "white" area. In effect every up-projection lies between four down projections and vice versa, except at the lattice edges.

In the main example in Australian Patent Specification No. 460,849, all projections on both tool sets are of equal height. That is, the envelope of each tool set is a plane. Hot sheet placed between the tools is drawn only when the tool sets act to interdigitate their respective projections. As the tool projections are all of equal height, each surface of the sheet is deformed to the same extent by the interdigitation. That is, each projection forces the sheet out of its initial plane to the same extent, either upwardly or downwardly.

The distance between adjacent cusps extending in the same direction (which is the same length as the diagonal of the lattice square) is thus the wavelength of the pattern. The equal deformation of each sheet surface provides the regular amplitude of the pattern wave. The deformed sheet is generally planar in form as it is encompassed by an envelope comprising the coplanar surfaces contacting all cusps in each oppositely directed set.

As cuspation technology is useful for the continuous production of long sheets of material, the term "machine direction" is synonomous with the length direction of the sheet. Similarly references to the width of the sheet or transverse measurement, refer to the direction at right angles to the machine direction.

Nevertheless, while the terminology of cuspation forming is used in the present specification, it is to be clearly understood that other methods may be used to form nonplanar sheets which can be incorporated in the products and methods of the present invention. For example, substantial lengths of nonplanar sheet material can be formed between rolls; die forming or dip-casting technology can be used to produce continuous or batch lengths of nonplanar material; and conventional casting methods can be used for noncontinuous production.

In accordance with the present invention there is provided a reticulated material of substantially planar configuration formed by the conjunction of a plurality of strips of nonplanar sheet material in which the strips lie substantially perpendicular to the plane of the reticulated material, the edges of the strips lying coplanar with the reticulated material and forming opposite surfaces thereof, characterized in that each strip of nonplanar sheet material is formed on each opposite surface with a pattern of crests and valleys of repetitive wavelength such that each pattern repeat contains at least two crests and at least two valleys, wherein in each pattern repeat the height of at least one crest or valley on at least one surface of the strip is different from that of at least one of the other crests and valleys on said surface, and wherein the said height difference is varied regularly to produce a corrugation along the strip having a wavelength greater than the wavelength of the crests and valleys, further characterized in that adjacent strips are abutted with the corrugation opposed to interfit at least one crest in a valley of each opposed corrugation.

The present invention also provides a method of preparing a reticulated material of substantially planar configuration in which a plurality of strips of nonplanar material lie in conjunction with the strips substantially perpendicular to the plane of the reticulated material, including: forming a plurality of substantially similar strips of nonplanar material each having a pattern of crests and valleys of repetitive wavelength such that each pattern repeat contains at least two crests and at least two valleys, wherein in each pattern repeat the height of at least one crest or valley on at least one surface of the strip is different from that of the other crests and valleys on said surface, and wherein the said height different is varied regularly to produce a corrugation along the strip having a wavelength greater than the wavelength of the crests and valleys; abutting adjacent strips with the corrugations opposed and interfitting at least one crest in a valley of each opposed corrugation.

The products of the present invention are characterized firstly by the repetitive pattern of crests and valleys formed on each opposite surface of the sheets which are interfitted in the specified manner to form the composite reticulated material of the invention. Provided the essential features outlined above are incorporated in the crest and valley pattern, a relatively wide variation of patterns is possible. These variations are described more fully later in this specification with reference to the accompanying drawings which assist in an understanding of the complex shapes involved.

The terms "crest" and "valley" have been chosen for use in broadly describing and defining the present invention to assist in forming a mental picture of the sheet materials which will assist in distinguishing between the oppositely directed cusps. Thus the term "crest" is used for an upwardly directed cusps of a horizontal sheet and the term "valley" for the downwardly directed cusps of the sheet.

In many preferred forms of the invention, the crests and valleys have sides of approximately conical form, thus approaching a peak. It is to be understood however that such peaked crests and valleys are not an essential feature of the invention. Thus, crests and valleys may be formed with nonconical sides, for example as ridges running in any desired direction relative to the length of the sheet. Crests and valleys with conical sides may not form a sharp peak but may be deliberately flattened by the use of a non-pointed forming tool. The crests and valleys may also be in cruciform or curved shapes.

The present invention preferably employs tooling having the same regular projection spacing as discussed above for the prior art cuspation procedure. However in the tooling for the present invention, the projection heights vary so that the envelope of each respective upper and lower tool is profiled to a waveform having a repeat dimension which is an integral multiple of two or more times the wavelength of the tooling pattern.

This envelope waveform may be a corrugation or any other standing waveform in two dimensions, our preferred case being a flat-topped corrugation in the machine direction. The tooling patterns of the present invention thus embody both the bilateral cuspation introduced by interdigitation and a relatively larger waveform as provided by the tooling profile. The cuspation induced by interdigitation may be varied in depth depending on the relative approach of the tools but the tooling profile wavelength is fixed for any one tool pattern.

Thus the minor wavelength is determined in the same manner as for the simple cuspation previously described. The major wavelength of the repeated pattern variation is determined from the tool profile. The amplitude of the minor waveform in the products of the present invention is no longer constant because the planar sheet starting material is deformed both by the tooling projections and by the waveform tooling profile. We refer therefore to the "interdigitative depth" of the crests and valleys of the sheets used in the present invention, rather than to their amplitude.

The nonplanar sheets used to form the reticulated materials of the present invention are normally produced as wide continuous sheets more than one meter wide. However the width of the sheets or strips used to form the reticulated material may be any multiple of half the minor wavelength so that the cuspated sheet may yield as many as one hundred strips each equal to the thickness when reformed into reticulated material. It is a production advantage of the present invention that formed sheets can be subdivided longitudinally to form relatively narrow strips which are then used in forming the reticulated materials of the invention. The requirements for subdivision of sheets as formed will be discussed more fully hereafter.

In many preferred forms of the invention the tool projection shape and the interdigitative depth are specially chosen. In one important product form described later in further detail we engender a resilient or compliant mat by increasing interdigitative depth while at the same time employing slender or pointed projections. In products of this sort as the interdigitative depth increases the interlattice cross section becomes more and more sinuous, thus is able to act in semi rigid media as a spring. The extent of interdigitation and hence the interdigitative depth can be readily varied if the cuspation process is used as the manufacturing method.

A second special case requires maximisation of vertical load bearing strength. In this situation it is essential to minimise the sinuousity of the cell wall. Here we prefer to use blunt cusps of two relatively large diameters, the smaller diameter forming the male cusp while the larger forms the female and the two being close fitting. In such a case the interlock is a packed group of cusps within cusps giving excellent column strength. Such interlock is shown in FIG. 12 later described.

The accompanying drawings are given to assist an understanding of the present invention and to illustrate various preferred forms of the invention. It is to be understood that the invention is not limited to the sheet configurations illustrated or to the methods described with reference to these figures.

In the drawings

FIGS. 7A to 7C are a group of schematic views similar to FIG. 3 of alternative tool patterns;

Figure 1:
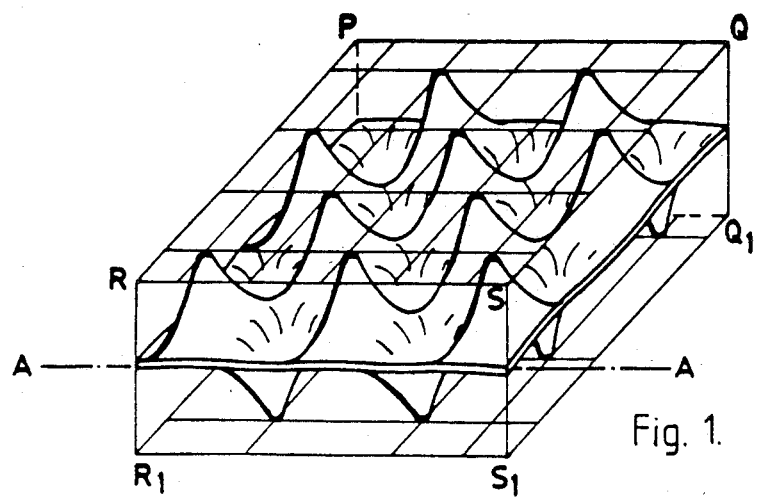
FIG. 1 is a somewhat diagrammatic representation of a simple form of nonplanar sheet.
Figure 2:
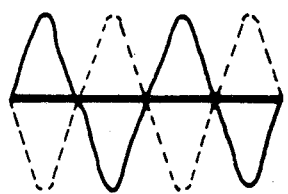
FIG. 2 is an edge view of the sheet of FIG. 1.

As indicated above, cuspation thermoforming is a preferred form by which the sheets used in the present invention may be prepared. FIGS. 1 and 2 are included in the present specification for comparative purposes and to assist an understanding of the basic principles of cuspation thermoforming and the developments to these principles which have been made in the production of the sheets used in the present invention.

FIG. 1 shows a nonplanar sheet which may be formed by cuspation of the sheet in a plastic state between opposed tools each having a patterned array of projections. The opposed patterns of projections are such that the projections on the respective tools can be interposed so that crests formed on one surface of the sheet are equally spaced from valleys formed on the other surface of the sheet. The peak of each crest and each valley is located at the intersection of a square grid, the grid lines of which run parallel with and transverse to the sides of the strip. On either surface, diagonal lines of peaks run parallel at 45° to the square grid lines.

This is a preferred form of peak placement used in producing sheets for use in the present invention. However, in the sheet of FIG. 1, all crests and valleys are of the same height and the crest height is the same as the valley height. Thus the peaks of the crests and the peaks of the valleys lie in parallel planes P Q R S and $P_1Q_1R_1S_1$ and if the sheet is cut along a nodal line such as A—A parallel to a grid line and located midway between the peaks of adjacent crests and valleys, a cross-section of the form illustrated in FIG. 2 is obtained. Accordingly, sheets of the FIG. 1 configuration are not readily adapted for stable edge mounting on the relatively straight edge line formed by dividing the sheets along such nodal lines. Even when closely nested, adjacent sheets of FIG. 1 configuration placed on edge have no resistance to toppling if stressed transverse to the edge line of any one sheet.

It is now been found that modification of the geometry of the sheets allows edge stacking of the sheets to provide stable reticulated materials. Thus more complex forms of nonplanar sheet than that illustrated in FIG. 1 can be formed in which each sheet has on each opposite surface a pattern of crests and valleys of repetitive wavelength such that each pattern repeat contains at least two crests and at least two valleys. In addition, if the height of at least one crest or valley on at least one surface of the sheet in each pattern repeat is different from that of the other crests and valleys on the selected surface and this height difference is varied regularly to produce a corrugation along the sheet which has a wavelength greater than the wavelength of the crests and the valleys, adjacent strips can be abutted with the corrugations opposed to interfit at least one crest in a valley of each opposed corrugation.

Figure 3:
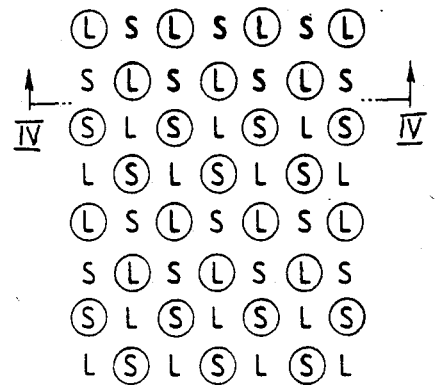
FIG. 3 is a diagrammatic representation of a tool pattern which may be used to produce a nonplanar sheet for use in accordance with this invention.

FIG. 3 illustrates diagrammatically the type of tool pattern which may be used to produce by cuspation one preferred form of sheet used in the present invention. This diagram shows the pattern in which the interposed projections of the two tools are arranged. The upwardly movable tool projections are indicated simply by the letters S and L while the downwardly movable tool projections are indicated by the same letters which have been circled. The letters S and L indicate the relative lengths of the projections with all the S projections being the same length as each other and relatively shorter than the L projections. The L projections are also all of the same length as each other.

It will be seen that in the tool pattern of FIG. 3 (as in the tool pattern used to produce the sheet of FIG. 1) the interposition of the tooling projections produces alternating peaks and valleys in each successive grid line transverse to the machine direction which is indicated by the arrow A in FIG. 3. However, the pattern of projections on the respective upwardly movable and downwardly movable tools is such that the height of the tool projections alternates in the machine direction whereby we have alternating transverse rows of two long projections, two short projections, two long projections, two short projections, and so on. This may be referred to for convenience as a two long/two short pattern.

When the tools of the FIG. 3 pattern are interposed, the long projections of one tool are, as shown, interposed between the short projections of the opposing tool. This maximises the effect of the longitudinally extending corrugation formed is the product sheet and is possible whenever a given number of long-projection transverse rows alternates with the same number of short-projection rows. If the number of long-projection rows differs from the number of alternating short-projection rows, exact opposition of the long and short projections on the respective tools is not possible. The long and short projections should then be opposed as directly as possible to maximise corrugation of the product sheet. However, corrugated sheet in accordance with the invention can also be produced if projections of the same length on opposed tools are interposed.

Figure 4:
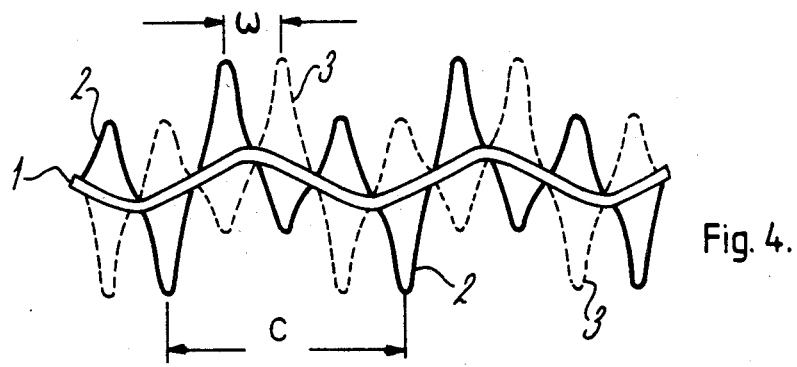
FIG. 4 is an edge view of a nonplanar sheet produced with a tool of the type illustrated in FIG. 3.

FIG. 4 is a diagrammatic presentation of an edge view of the type of sheet formed using the tooling pattern of FIG. 3. This diagrammatic view is taken along an edge of sheet cut along the line forming the midpoint between adjacent longitudinally extending rows of crests and valleys. The line taken for FIG. 4 is shown as IV—IV in FIG. 3. The thick corrugated line 1 in the center of FIG. 4 follows the configuration of the cut edge. The full line 2 shows the height of the crests and valleys extending longitudinally of the sheet nearest to the cut edge and the broken line 3 shows the height of the crests and valleys in the adjacent longitudinally extending line of crests and valleys. The wavelength between adjacent crests is indicated by w and it will be appreciated that this distance is greater than that measured in the plane of FIG. 4 as it is taken between two peaks, one of which is closer to the plane of the paper than the other. The wavelength C is that of the transverse corrugation formed by the repetition of the height differences in the pattern. C is shown as extending between the peaks of two valleys in the longitudinal row nearest to the edge of the diagram. It will be appreciated that this wavelength is the same as the wavelength of the curved edge shown in the center of the diagram.

Figure 5:
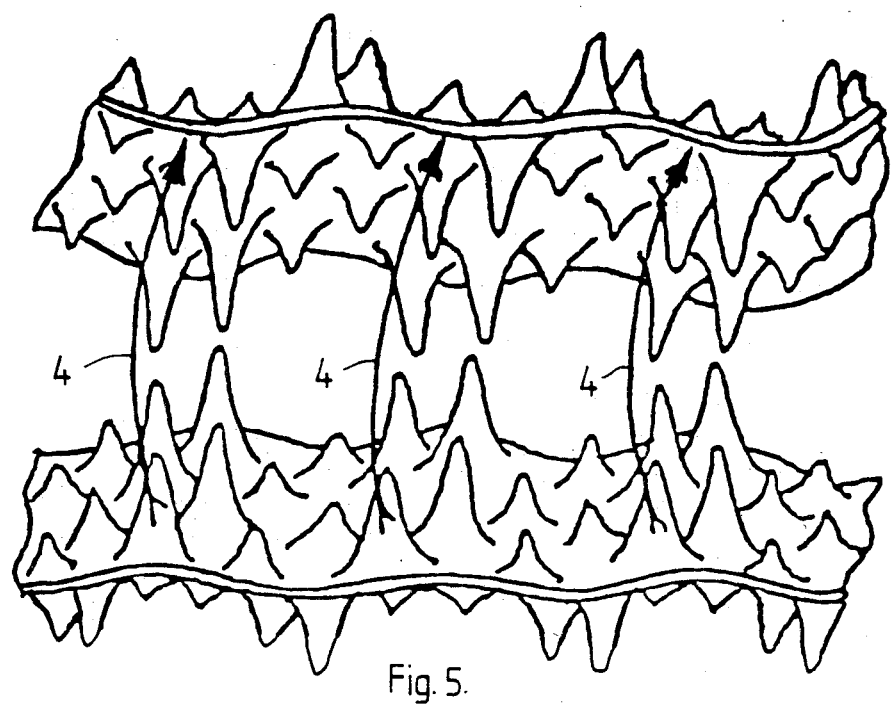
FIG. 5 is a diagrammatic perspective representation of two opposed sheets formed using the type of tool illustrated in FIG. 3.

FIG. 5 is a diagrammatic perspective representation of two sheets of the form produced by the tooling pattern of FIG. 3. The arrows 4 extending from the lower sheet indicate the interfitting of the lower crests into the valleys of the upper sheet. The conjunction of four such sheets is diagrammatically illustrated in FIG. 6. The reticulated nature of the material formed by the conjunction of these sheets is evident in FIG. 6 which shows the transversely extending pockets 5 which remain when the crests and valleys of the opposed corrugations are interfitted.

While sheets having a crest and valley configuration of the type illustrated in FIGS. 3 to 6 is presently preferred, it will be appreciated that many other types of crest and valley configuration can be used in accordance with the present invention.

Figures 7A, 7B, 7C:
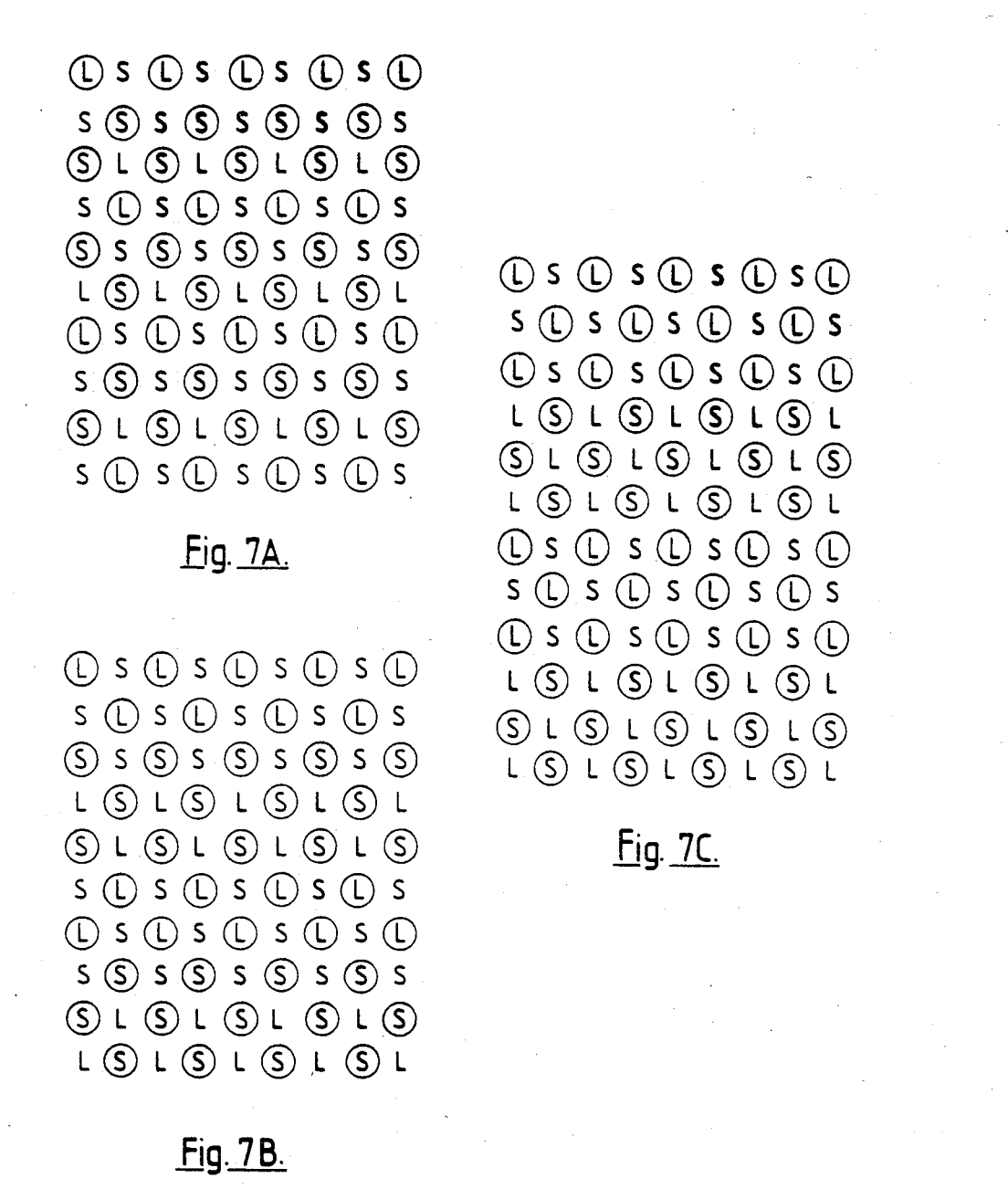

In FIGS. 7A to 7C we have illustrated some additional alternative tooling configurations in the same manner as FIG. 3. Using the same pattern terminology as indicated above for FIG. 3, it will be seen that FIG. 7A illustrates a one long/two short pattern, FIG. 7B illustrates a two long/three short pattern, and FIG. 7C illustrates a three long/three short pattern.

Other tooling configurations may be used to produce sheets for use in the present invention by one or more of (a) further varying the numbers of the alternating long-projection and short projection rows, (b) moving one tool relative to the other and thus altering the interpositioning of the respective projections, and (c) introducing occasional projections of the other length into the respective transverse rows of long or short tools.

It should also be understood that tooling configurations may be used in which more than two alternative projection lengths are used.

To illustrate the way in which the alternative forms of sheet shown in FIG. 7 may be used to produce the reticulated material of the invention, FIG. 8 contains a number of schematic edge views. It must be appreciated that these schematic end views have been simplified by ignoring the crests and valleys produced by the shorter tool projections and showing only the crests and valleys for the first two longitudinally extending rows of crests and valleys produced by the longer tooling projections. That is, these schematic views show only the longer crests and valleys in the row nearest the edge and in the row next from the edge. This simplification may be more clearly appreciated by comparing the schematic edge view of FIG. 8A with the more detailed diagrammatic views of the corresponding two long/two short pattern sheets in FIGS. 4 and 6.

Figure 6:
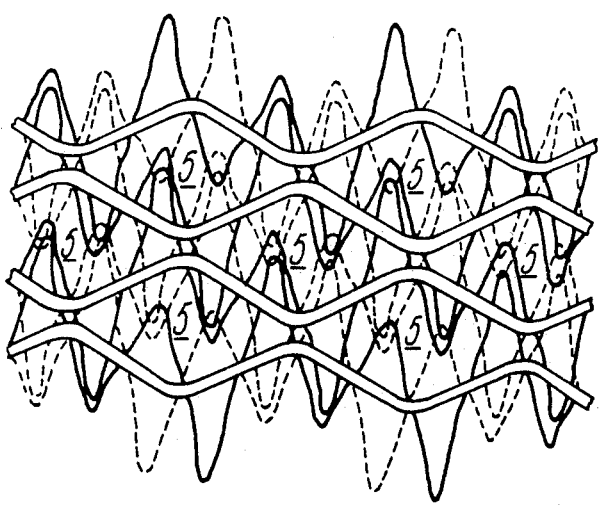
FIG. 6 is a diagrammatic edge view of a reticulated material formed by the conjunction of four sheets formed using the type of tool illustrated in FIG. 3.
Figure 8A:
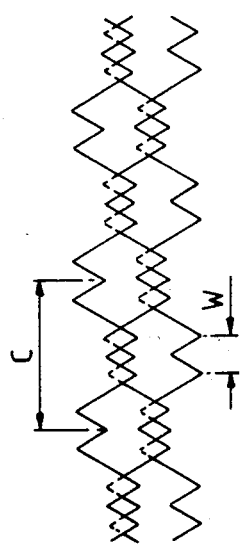
FIGS. 8A to 8F are a group of schematic edge views illustrating the conjunction of alternative forms of nonplanar sheet.
Figure 8B:
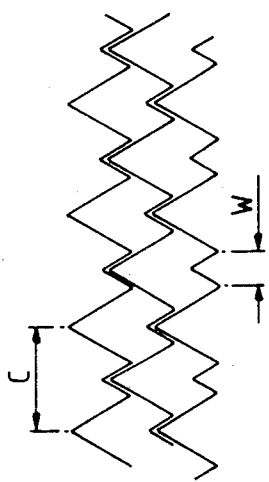
Figure 8C:
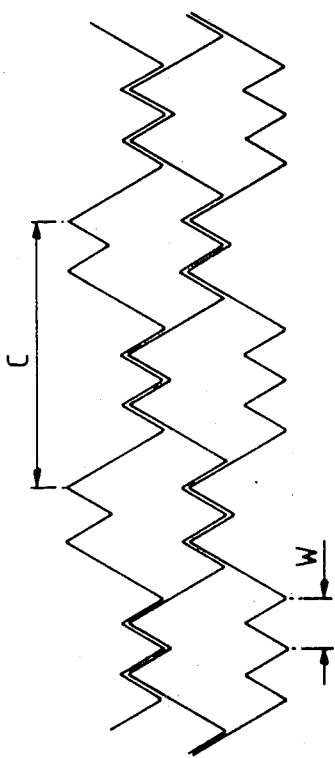
Figure 8D:
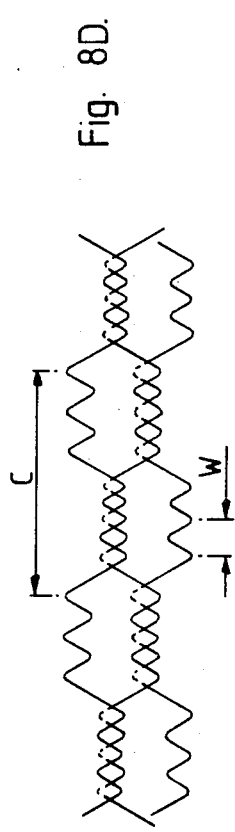
Figure 8E:
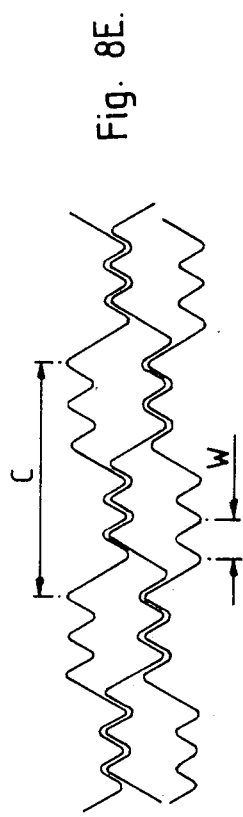

Thus, FIG. 8A shows the preferred form of interfitting the sheets shown in FIGS. 4, 5 and 6 and is a further simplified version of FIG. 6. FIGS. 8B, 8C and 8D show the preferred forms of interfitting the sheets produced by the tooling patterns of FIGS. 7A, 7B and 7C respectively. It will be apparent that the more complex sheet forms may be interfitted in other ways as shown, for example in FIG. 8E which is a less-preferred variation of FIG. 8D.

Figure 8F:
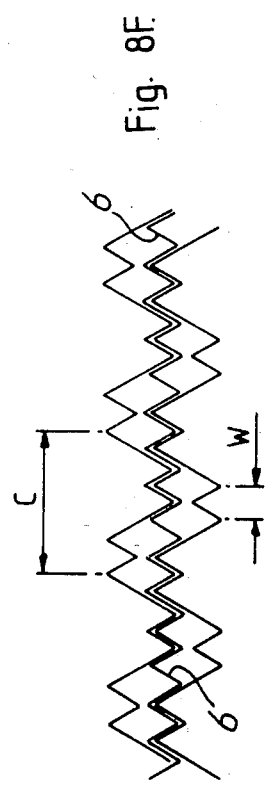

It will be noted that in all of the schematic views of FIGS. 8A to 8F, substantial transversely extending cells are left between the interfitted sheets to provide the reticulated structure of the invention. In FIG. 8F a modification of the present invention is illustrated in which a simple cuspated sheet 6 of matching wavelength w to the wavelength between adjacent crests in the more complex sheets of the invention may be interleaved between the more complex sheets.

To produce the reticulated material of the invention, adjacent corrugated sheets are abutted with the corrugations opposed and at least one crest is interfitted in a valley of each opposed corrugation. The abutment of the sheets and the interfitting of the crests and valleys may be achieved in a variety of ways. For example, if sheets aligned one above the other are offset longitudinally by half the wavelength of their corrugations, the corrugations will abut. As an alternative, if a single sheet is cut longitudinally and the two parts folded together like a book, the corrugations will nest. The particular sequence of operations used will depend on the form of the sheets which are to be abutted and interfitted and on the form and desired end use of the product reticulated material.

Thus the full width or any lesser width which includes at least one repeat of the pattern in the original sheet can be abutted corrugation to corrugation with adjacent sheets to form an open nested stack. Stacks of substantial width can, if necessary after stabilization by clamping or otherwise, be sliced vertically in the machine direction to obtain a plurality of submultiples of the original stack which, when laid horizontally, will themselves be sheet materials having a width corresponding to the height of the original stack.

Preferably however, sheets of substantial width are divided into submultiples referred to herein as strips, having a width which corresponds to the desired height of the product stack of reticulated material. The collation of adjacent sheets into the open nested reticulated materials of the present invention may be conducted as a substantially continuous process by the use of preformed and possibly stored sheets or strips of nonplanar material having the desired pattern.

In the preferred continuous collation process, a larger number of strips may exist and it is important to devise means for rapid continuous collation which once begun will be self perpetuating. However, a continuous plurality of strips when turned on edge and collated will normally undergo a width change. If the strip width is w (the minor wavelength), collated width will be similar to original sheet width, but if the width of strip is 2 w or 3 w, collated width will be about one-half or one-third of the original sheet width. Further, the collation compactness diminishes as interdigitative depth is increased. However collated width is roughly inversely proportional to number of wavelengths per strip width. Due to width change as the strips converge or diverge their paths curve if we try to collate all at once, and hence the abutments lose phase and the collation becomes impossible to impose, let alone sustain.

However, in the method we have termed binary collation, the act of collation is easily initiated and once begun is self sustaining under tension. In binary collation pairs of strips are turned inward bookwise, the centre lines being kept parallel to the machine line. These collated pairs slide in guides. By means of further guides pairs of pairs are curved towards each other maintaining mirror-image symmetry on a midline parallel to machine direction. Then by further guides quartets are symmetrically joined. At all times the actual strips due to intermesh have identical path lengths and hence retain phase. In this process the initial strip numbers need not be exactly $2^n$ since any residues are consumed in the binary reduction.

Figure 9:
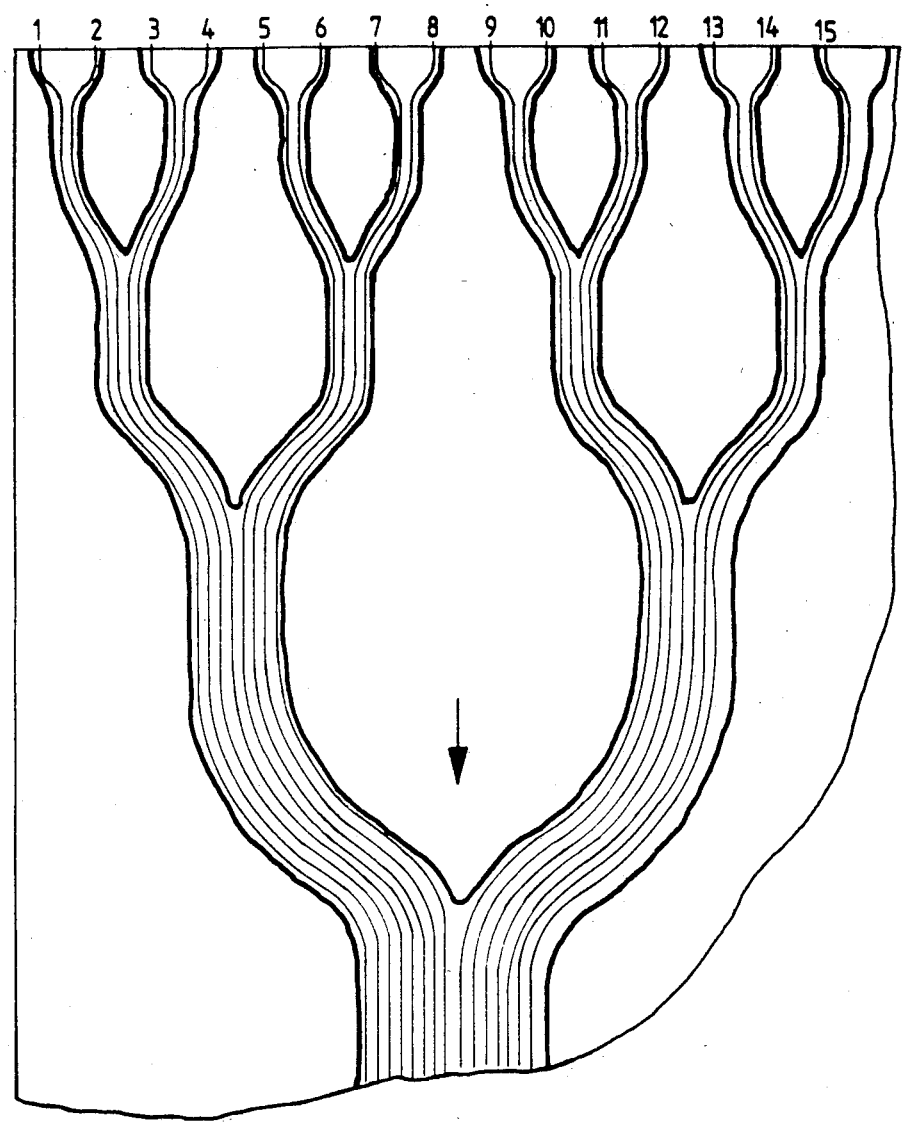
FIG. 9 is a diagram illustrating a method of joining adjacent sheets.

Binary collation is shown in FIG. 9 where 15 strips are initially paired as far as possible: 1-2, 3-4, 5-6, 7-8, 9-10, 11-12, 13-14. The odd strip 15 is not involved in the first folding and abutment step but enters the process in the next step being folded to abut with strip 14 in the pair 13-14. Similarly the free surfaces in the pairs 1-2/3-4, 5-6/7-8, 9-10/11-12 are abutted in the second step. In the third step, the free surfaces of strips 4 and 5 and of 12 and 13 respectively are abutted, and the final step abuts the free surfaces of strips 8 and 9.

Alternatively a sheet of nonplanar material may be slit to form a plurality of longitudinally extending strips connected at intervals by relatively short webs of unslit material. The webs of unslit material are located across the peaks of the corrugations and alternate transversely of the sheet so that slits with webs across the peaks of upwardly extending corrugations alternate with slits with webs across the peaks of downwardly extending corrugations.

This form of partial slitting can be used when the depth of the crests and valleys is sufficiently shallow to allow alternate reverse folding along the slit lines and nesting of opposed crests and valleys without interference as the folding brings the corrugations on adjacent strips into abutment.

Figure 10:
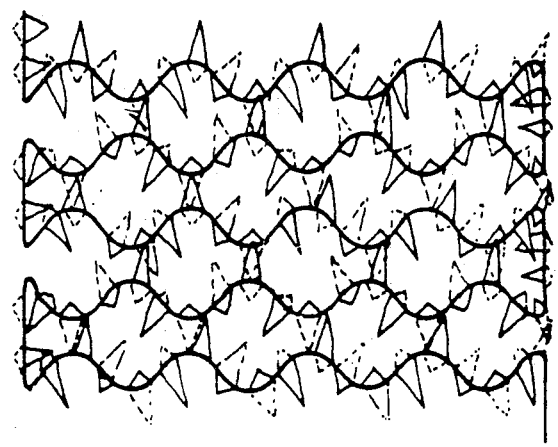
FIG. 10 illustrates one method by which reticulated material of the invention can be formed.

As a further alternative, preformed strips having the width desired for the final height of the product reticulated material can be folded back along themselves at regularly spaced predetermined intervals to provide a mat-like structure of the form illustrated in FIG. 10.

Preformed nonplanar sheets may be stored prior to use in coils or otherwise and may be fed through slitting and collating machines to form the reticulated material of the invention. Thus a preformed sheet may be cut into strips by a fixed cutting bar and adjacent strips are then half rotated in an alternative sense prior to abutment of adjacent strips followed by successive abutment of adjacent strip groups until the fully assembled material is produced. The binary collation procedure described above is preferably used in this procedure.

The reticulated material thus formed is preferably stabilized before being cut to desired lengths. It is an advantage of the present invention that, while the width of reticulated material initially produced is limited by the width of the original nonplanar sheet and by the extent of subdivision which has been applied to this sheet to produce the desired height of reticulated material, the reticulated material may be produced to have any desired length. By moving the desired length of product material sideways after cutting from the production line, successive product sheets can be abutted sideways to form any desired width of the product.

Figure 11:
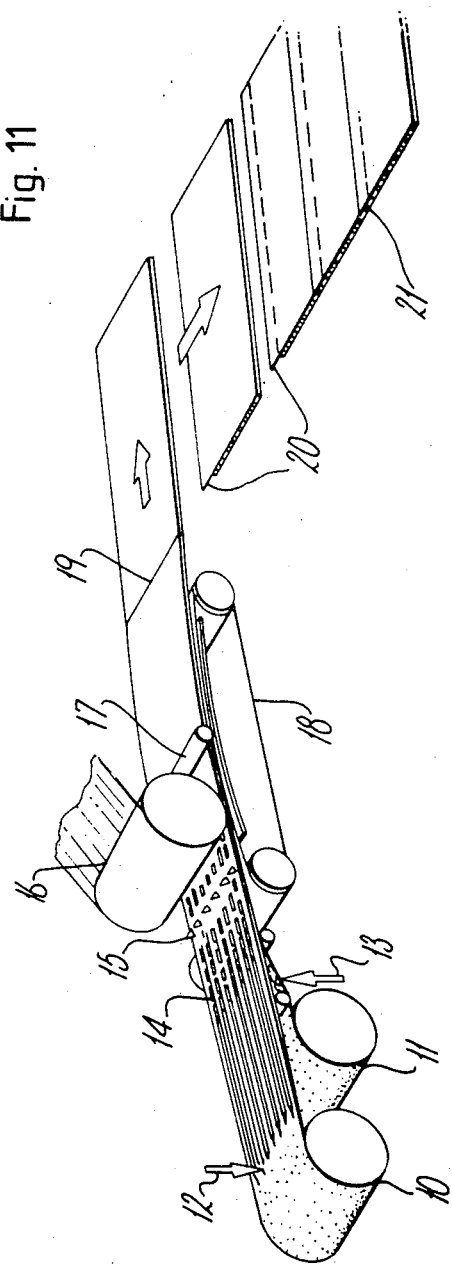
FIG. 11 is a diagrammatic representation of one form of production line which may be used to produce the reticulated materials of the invention.

FIG. 11 illustrates one form of production line using two coils 10, 11 of differently coloured preformed nonplanar sheet which are slit at 12 and 13 respectively and interspersed prior to the collation step at 14. Interspersion of two sheets is not necessary but may be used where two colour product is desired. After collation the product reticulated material is stabilized by flame bonding at 15 to a planar sheet from roll 16. The stabilized product is held between clamp roll 17 and belt 18 then cut at 19 to the desired length before being moved sideways. If desired a selvedge 20 of the stabilizing sheet material may be left to assist in connection of the individual product sheets to an end product sheet of reticulated material 21.

The description in relation to FIG. 11 has introduced the concept of stabilizing the reticulated material product. As in the production line illustrated in FIG. 11, stabilization may be achieved by bonding a sheet of appropriate material to one surface of the reticulated product. Thus the product may be backed by fusion or adhesive bonding to a sheet, film, fabric or plastic mesh on one side only. Fusion by flame bonding is presently preferred.

Alternative means of stabilizing the reticulated product include stitching or tufting fastening strands from surface to surface of the product material and securing a strand at least once around each pair of adjacent strips. Fastening strands may also be threaded through at least some of the interfitted crests and valleys and secured at each opposite edge of the material. To assist the latter form of stabilization the peaks of the crests or valleys may be cut off or pierced during or after the formation of the material and cords or wires passed through the colinear passages so created. Other alternative forms of stabilization will be apparent to those skilled in the art. For example a stack or sheet of product material may be stitched into an overwrapping bolster.

As an alternative to, or in addition to, the stabilizing methods indicated above, the reticulated material may be at least partly filled with a material which will set to stabilize or otherwise modify the properties of the product structure. For example, the pockets can be filled with an elastic foam such as rubber latex foam or a setting cement. The structure may be partially embedded in a setting material. Other materials which modify the properties of the product material may also be filled into the pockets which characterize the product material of the invention.

The product materials may also be used to reinforce foam such as latex or polyurethane flexibles which have natural resilience but are of low grade in structural merit and/or specific resilience. Thus it has been found that reticulated cuspated structures based on pliable (but not rubbery) plastics act as high specific resilience reinforcers for foam rubbers. For example, a heavily corona-discharge treated 150 micron polypropylene reticulated product of two long/two short pattern configuration and of 10 mm layer thickness was tested. Small wavelength w was 4 mm and large wavelength $\overline{W}$ was 24 mm stabilized by a 20 micron film on one side and weight 220 gsm.

After a dip and drain in a dilute urethane primer, S.B.R. rubber latex foam was spread to fill the reticulation cells and the product was dried in a tunnel oven at 130 deg Celsius for ten minutes. The resultant highly resilient composite cushion supported five times the indent load for equal deflection over the latex alone, and 1.5 times that of the unfilled product alone.

Such composite cushions may form an integral part of underlay, mat, integral carpet back, carpet tile, resilient smooth flooring and doormats, etc. Their appearance is good and the cuspated core confers useful abrasion resistance. A synergistic effect on properties for the composite over its components is apparent, and is due in part to the foam fill further bracing the cuspated cells forcing the foam to act as a column under side constraints.

Urethane flexible foams also produce cost efficient composites and their adherence is such that no priming step is normally required. For all types of foam, it is advantageous to apply the spray or dip while the reticulated sheet is drawn over a convex path so that the structure gapes and is thereby more readily filled.

As previously indicated, the design of nonplanar sheet used to produce the product of the present invention will vary greatly depending on the desired nature of the end product. The types of product illustrated so far in this specification have relatively fine crests and valleys of substantial height and wavelength separation compared with the thickness of the material from which they are formed. However, both the shape and spacing of the crests and valleys may be varied. In coarse patterns the material forming the sheet is usually relatively thin with respect to the open volume in the product material. The expression "bulk density" is used to provide a measure of how many times lighter the product material is than an equal volume of the solid material from which it is formed. For example, balsa wood which is mostly air, has a bulk density of about 20, very light plastic foams have bulk densities of 50. A heavy load bearing mat made from the material of the present invention and intended for use as a light air strip or temporary road will have a bulk density around 10.

Figure 12:
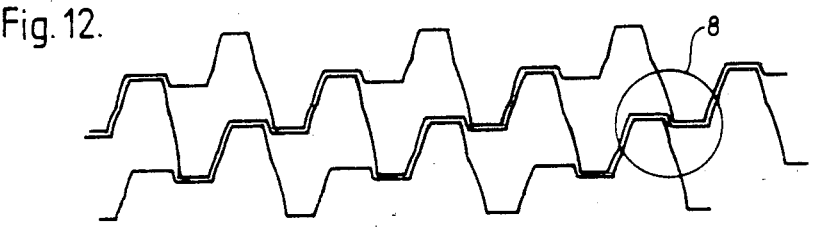
FIG. 12 is a schematic edge view of a configuration used to produce high impact strength reticulated material.

For heavy load bearing applications, resilience of the product material is not appropriate and load bearing strength can be maximized by employing relatively blunt crests and valleys of two diameters having shallow interdigitation. The dimensions of the opposed crests and valleys are arranged so that the interfitting parts form a columnar block 8 in the end product which has minimal freedom to move, the interfitting crests and valleys of different dimensions having a closely sliding bolt-like fit as illustrated in FIG. 12. To achieve the desired load bearing properties, the interfit of the crests and valleys must not only be close but the diameter of the projections in the forming tool and the thickness of the starting sheet material are selected so that the diameter of the wall cusps approaches half the wavelength of the crest and valley pattern.

Figure 13:
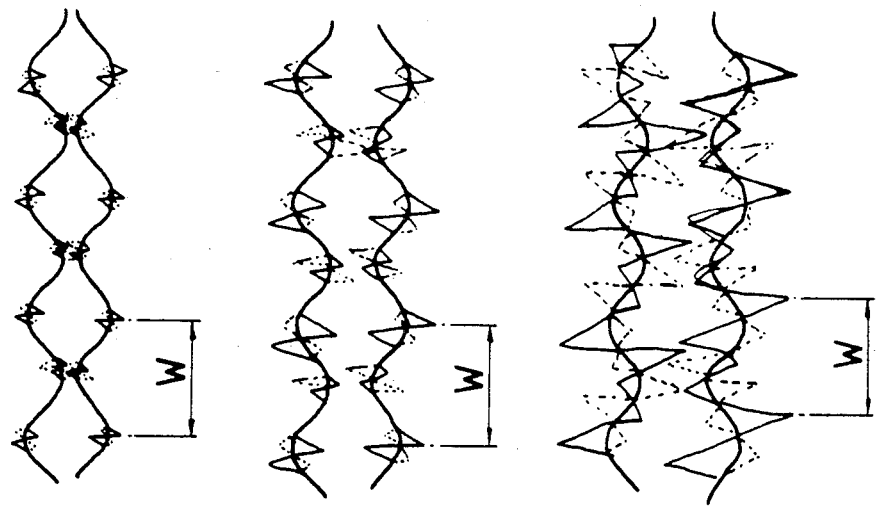
FIG. 13 is a diagrammatic representation of the effect of varying the interdigitative depth.

Resilient open structures such as flexible synthetic foams also act as cushions but their cellular structure is typically so fine that both abrasion resistance and tear strength are low while the huge internal surface area makes such materials dangerously inflammable. Diagrammatic cross sections of reticulated structures with different interdigitative depths are shown in FIG. 13. In FIG. 13 (a) the interdigitative depth is 1 mm, in FIG. 13 (b) it is 4 mm and in FIG. 13 (c) it is 7 mm.

In these structures the material was cuspated in each case from ethylene-vinyl acetate copolymer initially 0.7 mm thick and with w=8 mm. In the examples given the reticulated material in case (a) was harsh and uncompliant with less than 5% compression under loads of 3 Kg/cm$^2$. In case (c) under the same load resilient compression of 15% was observed. To obtain appreciable spring effect interdigitative depths should lie between 0.5 and 1.5 times the minor wavelength and to ensure that cusps (which disarticulate by a rolling hinge action) can "find" the opposite cavity as they close on a radius, tool projections of a slender pointed form are preferred.

The thermoplastic material which may be used to produce the products of the present invention is not narrowly limited. Pliable materials such as low and high density polyethylene, often with vinyl or acetate comonomer and the softer grades of acrylonitrile-butadiene styrene are appropriate for resilient goods. Certain rubbers may be used. Harder plastics such as polypropylene, thermoplastic polyester, polystyrene, polyphenylene oxide, unplasticized vinyl and high impact acrylic are all applicable. Glassy melt materials such as inorganic glass or slag may be used. So also may edible thermoplastic such as candy. Superplastic or other metal alloys may also be used.

The products of the invention are thus reticulated materials in which the junctions between adjacent sheets or strips are given shear strength by interfitting abutments. However, desirable pliability of the products is maintained because the interfitted abutments are optionally demountable. The mat-like products can thus be rolled up when not in use.

The interfitted products of the invention are able readily to dissipate stress concentrations. Variation of the interdigitative depths and the form of the cusps allows variation of the loadbearing rigidity from stiff to resilient.

In other lightweight cellular constructs such as honeycomb and foamed plastics the object is to obtain cost-efficient properties especially in terms of strength and resilience. Limitations on these micro-engineered materials arise partly from the fact that specific properties are tied together. For example in rigid and flexible foams low density is always associated with ultra-thin cell walls and huge internal area; hence, these extremely intricate materials tend to have poor abrasion strength. These facts, in turn, derive from the physics of stable bubble aggregates. In honeycomb, no useful strength as a core exists until the component sheets are glued together. The pliability of a honeycomb system bonded to a one face sheet is then very limited. Further, honeycomb while admittedly having admirable strength as a column, is devoid of toughness and springiness and always subject under destructive loads to a catastrophic irrecoverable collapse.

With the reticulated materials of the present invention, the several design variants are independent. These include the wavelength between the crests and valleys and the waveform of the forming tooling determined by the pattern repeat. Degree of interlock is a separate function varied by depth of interdigitation; in turn interdigitative depth steeply influences resilience. Cell shape and mode of flexure under load are also elective variables. Furthermore, since every bilateral cuspation is a minimum area response to free tension, the internal surface area of the present materials tends to the least possible for a given cellularity; hence these materials are extremely robust and abrasion resistant. Product sheet height is also readily varied by altering the width of the strips forming the composite material. This width can be any selected number of times the half wavelength between the crests and valleys. Also, blends of weights and qualities of material are elective. Finally, any reticulated product may be backfilled with any agent selected to produce synergistic benefits.

To sum up, the products may be specifically designed for bulk factor (apparent density), loadbearing, load-sharing and shear properties, pile depth, cell size, springiness, abrasion resistance, composite properties, yield profile under load and shock resistance, all as separate and adjustable features. It is a remarkable feature that the properties developed while the interlock is in place and which would be typical of a rigid structure disappear as the material disarticulates and rolls up on zero radius.

I claim:

1. A reticulated material of substantially planar configuration formed by the conjunction of a plurality of strips of nonplanar sheet material in which the strips lie substantially perpendicular to the plane of the reticulated material, the edges of the strips lying coplanar with the reticulated material and forming opposite surfaces thereof, characterized in that each strip of nonplanar sheet material is formed on each opposite surface with a pattern of crests and valleys of repetitive wavelength such that each pattern repeat contains at least two crests and at least two valleys, wherein in each pattern repeat the height of at least one crest or valley on at least one surface of the strip is different from that of at least one of the other respective crests or valleys on said surface, and wherein the recurring height difference produces a corrugation along the strip having a wavelength greater than the wavelength of the crests and valleys, further characterized in that adjacent strips are abutted with the corrugation opposed to interfit at least one crest in a valley of each opposed corrugation.

2. A reticulated material as claimed in claim 1 wherein each said strip is formed from a nonplanar sheet in which each crest and valley has sides of approximately conical form which approach a peak and the pattern of crests and valleys is such that the peaks are located at the intersections of a square grid the grid lines of which run parallel with and transverse to the sides of the strip.

3. A reticulated material as claimed in claim 2 wherein the pattern of crests and valleys in each sheet is such that each successive transverse grid line contains alternating crest peaks and valley peaks.

4. A reticulated material as claimed in claim 3 wherein the pattern of crests and valleys in each sheet is of the kind illustrated in FIG. 3.

5. A reticulated material as claimed in claim 4 wherein the relative dimensions of interfitting crests and valleys are such that the crests nest within and are retained by the valleys against movement of the adjacent strips in any direction transverse to the common axis of the interfitted crests and valleys.

6. A reticulated material as claimed in claim 5 wherein the crests and valleys have substantially conical sides merging to an end selected from the group consisting of substantially sharp peaks, an arcuate dome, and a flat plateau.

7. A reticulated material as claimed in claim 6 wherein the ends of the crests and valleys of lesser height are of greater diameter than that of the ends of the crests and valleys of greater height.

8. A reticulated material as claimed in claim 1 wherein the adjacent strips are held in their interfitted position by means selected from fixing at least one surface of said material to a backing sheet, passing a plurality of fastening strands from surface to surface and securing a strand at least once around each pair of adjacent strips, threading fastening strands through at least some of the interfitted crests and valleys and securing each strand at each opposite edge of said material.

9. A reticulated material as claimed in claim 1 wherein the interdigitative depth of the crest and valleys is between 0.5 and 1.5 times the wavelength of the crest and valleys and the crests and valleys are pointed and slender.

10. A reticulated material as claimed in claim 1 wherein the spaces between adjacent strips are at least partially filled with a substance modifying the properties of the said material.

11. A method of preparing a reticulated material of substantially planar configuration in which a plurality of strips of nonplanar material lie in conjunction with the strips substantially perpendicular to the plane of the reticulated material, including: forming a plurality of substantially similar strips of nonplanar material each having a pattern of crests and valleys of repetitive wavelength such that each pattern repeat contains at least two crests and at least two valleys, wherein in each pattern repeat the height of at least one crest or valley on at least one surface of the strip is different from that of at least one of the other respective crests or valleys on said surface, and wherein the recurring height difference produces a corrugation along the strip having a wavelength greater than the wavelength of the crests and valleys; abutting adjacent strips with the corrugations opposed and interfitting at least one crest in a valley of each opposed corrugation.

12. A method of preparing a reticulated material of substantially planar configuration in which a plurality of strips of nonplanar material lie in conjunction with the strips substantially perpendicular to the plane of the reticulated material, including: forming at least one sheet of nonplanar material having a pattern of crests and valleys of repetitive wavelength such that each pattern repeat contains at least two crests and at least two valleys, wherein in each pattern repeat the height of at least one crest or valley on at least one surface of the sheet is different from that of at least one of the other respective crests or valleys on said surface, and wherein the recurring height difference produces a corrugation along the sheet having a wavelength greater than the wavelength of the crests and valleys; cutting the sheet to form a plurality of similar longitudinally extending strips each containing the same submultiple of the pattern in said sheet which includes at least one repeat of said pattern; abutting adjacent strips with the corrugations opposed and with at least one crest interfitted in a valley of each opposed corrugation.

13. A method as claimed in claim 11 wherein adjacent strips lie in a common plane after cutting and are folded laterally towards each other alternately up and down the longitudinally extending cutting lines to bring the opposed corrugations into abutment.

14. A method as claimed in claim 12, wherein successive pairs of adjacent strips are abutted while symmetrically placed along lines parallel to the longitudinal direction in which the sheets are formed adjacent abutted pairs and any remaining single strip are symmetrically curved by guides then abutted while symmetrically placed along lines parallel to the said longitudinal direction and abutment is then continued in this binary fashion always ensuring that the path lengths of the strip groups undergoing abutment are symmetrical mirror images thus providing that phase is identical at abutment, until the reticulated material is assembled.

15. A method of preparing a reticulated material of substantially planar configuration in which plurality of strips of nonplanar material lie in conjunction with the strips substantially perpendicular to the plane of the reticulated material, including: forming a strip of nonplanar material having a pattern of crests and valleys of repetitive wavelength such that each pattern repeat contains at least two crests and at least two valleys, wherein in each pattern repeat the height of at least one crest or valley on at least one surface of the strip is different from that of at least one of the other respective crests or valleys on said surface, and wherein the recurring height difference produces a corrugation along the strip having a wavelength greater than the wavelength of the crests and valleys; folding the strip at spaced intervals along its length back upon itself so that the corrugations on one surface oppose the corrugations on the opposite surface and at least one crest interfits with a valley of each opposed corrugation.

16. A method of preparing a reticulated material of substantially planar configuration in which a plurality of strips of nonplanar material lie in conjunction with the strips substantially perpendicular to the plane of the reticulated material, including: forming a plurality of substantially similar sheets of nonplanar material each having a pattern of crests and valleys of repetitive wavelength such that each pattern repeat contains at least two crests and at least two valleys, wherein in each pattern repeat the height of at least one crest or valley on at least one surface of the sheet is different from that of at least one of the other respective crests or valleys on said surface, and wherein the recurring height difference produces a corrugation along the sheet having a wavelength greater than the wavelength of the crests and valleys; slitting each sheet to form a plurality of similar longitudinally extending strips which are connected at intervals by relatively short webs of unslit material, the webs being located across the peaks of the corrugations and alternating transversely of the sheet so that slits with webs across the peaks of upwardly extending corrugations alternate with slits with webs across the peaks of downwardly extending corrugations, each strip containing the same submultiple of the pattern in said sheet which includes at least one repeat of said pattern; folding the strips laterally towards each other about said webs to bring the opposed corrugations into abutment and at least one crest into interfitting engagement with a valley of each opposed corrugation.

* * * * *